(12) United States Patent
Chen

(10) Patent No.: US 8,170,204 B2
(45) Date of Patent: *May 1, 2012

(54) METHOD AND SYSTEM FOR EXTENDING ADVANCED ENCRYPTION STANDARD (AES) OPERATIONS FOR ENHANCED SECURITY

(75) Inventor: Xuemin Chen, Rancho Santa Fe, CA (US)

(73) Assignee: Broadcom Corporation, Irvine, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 12/728,776

(22) Filed: Mar. 22, 2010

(65) Prior Publication Data

US 2010/0189261 A1     Jul. 29, 2010

Related U.S. Application Data

(63) Continuation of application No. 10/950,762, filed on Sep. 27, 2004, now Pat. No. 7,715,555.

(60) Provisional application No. 60/607,633, filed on Sep. 7, 2004.

(51) Int. Cl.
*H04L 9/28* (2006.01)
*H04L 29/06* (2006.01)

(52) U.S. Cl. ............................ 380/28; 380/259; 708/254

(58) Field of Classification Search .................. 380/28, 380/259; 705/254
See application file for complete search history.

(56) References Cited

U.S. PATENT DOCUMENTS

| | | | |
|---|---|---|---|
| 6,044,389 A | 3/2000 | Weng et al. | |
| 6,101,520 A | 8/2000 | Lan et al. | |
| 6,243,470 B1 | 6/2001 | Coppersmith et al. | |
| 6,246,768 B1 | 6/2001 | Kim | |
| 6,937,727 B2 | 8/2005 | Yup et al. | |
| 7,295,671 B2 | 11/2007 | Snell | |
| 7,305,085 B2 | 12/2007 | Ohkuma et al. | |
| 7,715,555 B2 * | 5/2010 | Chen | 380/37 |
| 2002/0012430 A1 | 1/2002 | Lim | |
| 2003/0039355 A1 | 2/2003 | McCanny et al. | |
| 2003/0086564 A1 | 5/2003 | Kuhlman | |
| 2003/0133568 A1 | 7/2003 | Stein et al. | |
| 2003/0219118 A1 | 11/2003 | Beverly | |

(Continued)

OTHER PUBLICATIONS

Advanced Encryption Standard (AES). Federal InformationProcessing Standards Publication 197. Nov. 26, 2001. pp. 1-51.*

(Continued)

*Primary Examiner* — Kambiz Zand
*Assistant Examiner* — Aubrey Wyszynski
(74) *Attorney, Agent, or Firm* — Sterne, Kessler, Goldstein & Fox PLLC

(57) ABSTRACT

In a wireless communication system, a method and system for extending Advanced Encryption Standard (AES) operations for enhanced security are provided. In an AES encryption operation, an initial state may be modified by XORing with an initial modifier before a first processing round and a final state may be modified by XORing with a final modifier after a final processing round. The output of a MixColumns function performed during AES decryption operation rounds may be modified by XORing with a corresponding round modifier. In an AES decryption operation, an initial state may be modified by XORing with a decoded final modifier before a first processing round and a final state may be modified by XORing with a decoded initial modifier after a final processing round. The input of an InvMixColumns function performed during AES decryption operation rounds may be modified by XORing with a corresponding decoded round modifier.

42 Claims, 6 Drawing Sheets

U.S. PATENT DOCUMENTS

| | | |
|---|---|---|
| 2004/0184602 A1 | 9/2004 | Nadehara |
| 2004/0228482 A1 | 11/2004 | Macchetti et al. |
| 2005/0058285 A1 | 3/2005 | Stein et al. |
| 2005/0213756 A1* | 9/2005 | Hubert ............................ 380/44 |
| 2005/0271204 A1 | 12/2005 | Chu |
| 2006/0002548 A1 | 1/2006 | Chu |
| 2006/0177052 A1* | 8/2006 | Hubert ............................ 380/29 |

OTHER PUBLICATIONS

Jarvinen, et al. "A Fully Pipelined Memoryless 17.8 Gbps AES-128 Encryptor" ACM, Feb. 23-25, 2003.

NIST: "Announcing the Advanced Encryption Standard (AES)", Federal Information Processing Standards Publication 197, Nov. 26, 2001.

* cited by examiner

METHOD AND SYSTEM FOR EXTENDING ADVANCED ENCRYPTION STANDARD (AES) OPERATIONS FOR ENHANCED SECURITY

CROSS-REFERENCE TO RELATED APPLICATIONS/INCORPORATION BY REFERENCE

This application is a continuation of U.S. patent application Ser. No. 10/950,762 filed on Sep. 27, 2004, which makes reference to, claims priority to and claims benefit from U.S. Provisional Patent Application Ser. No. 60/607,633 filed Sep. 7, 2004.

This application also makes reference to:
U.S. patent application Ser. No. 10/932,832, filed Sep. 2, 2004; and
U.S. patent application Ser. No. 10/933,702, filed Sep. 2, 2004.

The above stated applications are hereby incorporated herein by reference in their entirety.

FEDERALLY SPONSORED RESEARCH OR DEVELOPMENT

Not applicable.

MICROFICHE/COPYRIGHT REFERENCE

Not applicable.

FIELD OF THE INVENTION

Certain embodiments of the invention relate to cryptography. More specifically, certain embodiments of the invention relate to a method and system for extending Advanced Encryption Standard (AES) operations for enhanced security.

BACKGROUND OF THE INVENTION

In secured data transmission systems or cryptosystems, the use of standardized encryption algorithms provides a common platform from which compatible system components may be developed and/or deployed. Current encryption standards include the Data Encryption Standard (DES) and the Triple DES or 3DES. The National Institute of Standards and Technology (NIST) specified 3DES to provide more secure encryption than that achieved by DES given of the vulnerability of the latter to the use of more powerful computers. The use of 3DES was viewed as a temporary solution and on Nov. 26, 2001, NIST introduced the Advanced Encryption Standard (AES) as Federal Information Processing Standards Publication (FIPS PUB) 197, with the purpose of providing a longer term platform for the development of more secure cryptosystems. The AES specifies a FIPS-approved cryptographic algorithm, based on the Rijndael algorithm, that may be utilized to protect electronic data.

The AES algorithm is a symmetric block cipher that is capable of encrypting plaintext information into ciphertext and also decrypting ciphertext information into plaintext or descrambled information. The AES algorithm may use cryptographic or cipher keys of 128, 192, or 256 bits to encrypt and decrypt blocks of data. The length of the cipher key sequence is referred to as the key length, K. Input and output data blocks in the AES algorithm each consists of sequences of 128 bits. The length of the data blocks, is referred to as the block length. In addition, the AES specification provides that the AES algorithm may be implemented in software, firmware, hardware, or any combination thereof. The specification, however, does not provide a specific implementation, instead, the implementation may be based on several factors, for example, the environment, application, and technology being used.

In some instances, the security capabilities provided by the AES encryption/decryption standard may not be sufficient to accommodate the requirements of cryptosystems when utilized under certain conditions and/or certain applications. In these cases, an already taxed digital signal processor (DSP), system processor, or application specific integrated circuit (ASIC) may not be easily, or cost-effectively, adapted to accommodate the demands imposed by the application and/or conditions for which the secured data transmission system is intended.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for extending Advanced Encryption Standard (AES) operations for enhanced security. Aspects of a method for increasing encryption security may comprise generating an initial state by XORing a plaintext data block with an initial modifier. A first round output state may be generated in a first AES encryption round based on the generated initial state, wherein an output of a MixColumns function performed during the first AES encryption round is XORed with a first round modifier. After generating the first round output state, subsequent round output states may be generated in subsequent AES encryption rounds, wherein an output of the MixColumns function performed during each of the subsequent AES encryption rounds is XORed with a corresponding round modifier. After generating the subsequent round output states, a final round output state may be generated in a final AES encryption round. A ciphertext data block may be generated by XORing the generated final round output state with a final modifier.

The method may also comprise transferring the generated ciphertext data block via a first secure data channel to at least one device for decryption. The initial modifier, the first round modifier, the corresponding round modifier for each of the subsequent AES encryption rounds, and the final modifier may be generated based on a look-up table. In another embodiment, the initial modifier, the first round modifier, the corresponding round modifier for each of the subsequent AES encryption rounds, and the final modifier may be generated by a random number generator or a pseudo-random number generator. In the latter case, a seed value may be transferred through a secure channel to the pseudo-random number generator. In another aspect of the method, the initial modifier, the first round modifier, the corresponding round modifier for each of the subsequent AES encryption rounds, and the final modifier may be encoded and may be transferred via a second secure data channel to at least one device for decoding.

A machine-readable storage may be provided having stored thereon, a computer program having at least one code for increasing encryption security in cryptography operations, the at least one code section being executable by a machine for causing the machine to perform steps in the method described above.

Aspects of a method for increasing decryption security may comprise generating an initial state by XORing a ciphertext data block received via a first secure data channel with a final modifier. A first round output state may be generated in a first AES decryption round based on the generated initial state. After generating the first round output state, subsequent round output states may be generated in subsequent AES decryption rounds, wherein an input to an InvMixColumns function performed during each of the subsequent AES decryption rounds is XORed with a corresponding round modifier. A descrambled data block may be generated by XORing a last of the generated subsequent round output states with an initial modifier.

The method may also comprise transferring the generated descrambled data block via a data channel to at least one device for further processing. The initial modifier, the corresponding round modifier for each of the subsequent AES decryption rounds, and the final modifier may be generated based on a look-up table. In another embodiment, the initial modifier, the corresponding round modifier for each of the subsequent AES decryption rounds, and the final modifier may be generated by a random number generator or a pseudo-random number generator. In the latter case, a seed value received via a second secure data channel may be decoded to be utilized in the pseudo-random number generator. In another aspect of the method, an encoded initial modifier, an encoded corresponding round modifier for each of the subsequent AES encryption rounds, and an encoded final modifier may be received via the second secure data channel and may be decoded into the initial modifier, the corresponding round modifier for each of the subsequent AES decryption rounds, and the final modifier respectively.

A machine-readable storage may be provided having stored thereon, a computer program having at least one code for increasing decryption security in cryptography operations, the at least one code section being executable by a machine for causing the machine to perform steps for the method described above.

Aspects of a system for increasing encryption security may comprise circuitry for generating an initial state by XORing a plaintext data block with an initial modifier. Circuitry may be provided for generating a first round output state in a first AES encryption round based on the generated initial state, wherein an output of a MixColumns function performed during the first AES encryption round is XORed with a first round modifier. Circuitry may be provided for generating subsequent round output states in subsequent AES encryption rounds, after generating the first round output state, wherein an output of the MixColumns function performed during each of the subsequent AES encryption rounds is XORed with a corresponding round modifier. The system may also comprise circuitry for generating a final round output state in a final AES encryption round after generating the subsequent round output states. Circuitry for generating a ciphertext data block by XORing said generated final round output state with a final modifier may also be provided.

The system may also comprise circuitry for transferring the generated ciphertext data block via a first secure data channel to at least one device for decryption. Circuitry may be provided for generating the initial modifier, the first round modifier, the corresponding round modifier for each of the subsequent AES encryption rounds, and the final modifier based on a look-up table. In another embodiment, circuitry may be provided for generating the initial modifier, the first round modifier, the corresponding round modifier for each of the subsequent AES encryption rounds, and the final modifier by a random number generator or a pseudo-random number generator. In the latter case, circuitry may be provided for receiving a seed value via a secure parameter channel by the pseudo-random number generator. In another aspect of the system, circuitry may be provided for encoding the initial modifier, the first round modifier, the corresponding round modifier for each of the subsequent AES encryption rounds, and the final modifier. Circuitry may be provided for transferring the encoded initial modifier, the encoded first round modifier, the encoded corresponding round modifier for each of the subsequent AES encryption rounds, and the encoded final modifier via a second secure data channel to at least one device for decoding.

Aspects of a system for increasing decryption security may comprise circuitry for generating an initial state by XORing a ciphertext data block received via a first secure data channel with a final modifier. Circuitry may be provided for generating a first round output state in a first AES decryption round based on the generated initial state. Circuitry may be provided for generating subsequent round output states in subsequent AES decryption rounds, after generating the first round output state, wherein an input to an InvMixColumns function performed during each of the subsequent AES decryption rounds is XORed with a corresponding round modifier. Circuitry is also provided for generating a descrambled data block by XORing a last of the generated subsequent round output states with an initial modifier.

The system may also comprise circuitry for transferring the generated descrambled data block via a data channel to at least one device for further processing. Circuitry may be provided for generating the initial modifier, the corresponding round modifier for each of said subsequent AES decryption rounds, and the final modifier based on a look-up table. In another embodiment, circuitry may be provided for generating the initial modifier, the corresponding round modifier for each of the subsequent AES decryption rounds, and the final modifier by a random number generator or a pseudo-random number generator. In the latter case, circuitry may be provided for decoding a seed value received via a second secure data channel to be utilized in the pseudo-random number generator. In another aspect of the system, circuitry may be provided for receiving an encoded initial modifier, an encoded corresponding round modifier for each of the subsequent AES encryption rounds, and an encoded final modifier via a second secure data channel and for decoding them into the initial modifier, the corresponding round modifier for each of the subsequent AES decryption rounds, and the final modifier respectively.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for extending Advanced Encryption Standard (AES) operations for enhanced security. An integrated circuit (IC) solution for the AES algorithm may provide a built-in capability that allows for enhanced security while maintaining compatibility with the encryption and decryption operations specified by the AES standard. This approach may result in low-cost application specific IC encryption/decryption systems that are capable of providing sufficient computational resources to execute the operations of the AES algorithm while also supporting the use of additional security measures. Note that the following discussion may generally utilize the terms "encoding," "encrypting," and "ciphering" interchangeably. The terms "decoding," decrypting," and "deciphering" may also be utilized interchangeably. Accordingly, the scope of various aspects of the present invention should not be limited by notions of difference between the terms "encoding," "encrypting," and "ciphering" or between the terms "decoding," decrypting," and "deciphering."

Figure 1A:
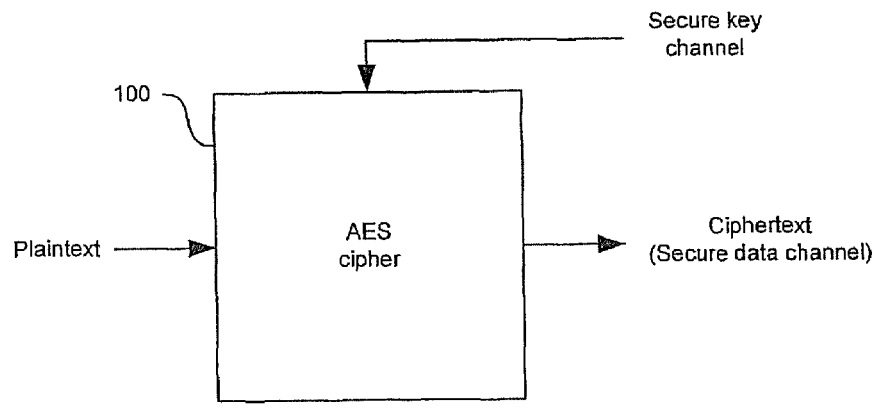
FIG. 1A illustrates an exemplary AES cipher, in connection with an embodiment of the invention.

FIG. 1A illustrates an exemplary AES cipher, in connection with an embodiment of the invention. Referring to FIG. 1A, the AES cipher 100 may comprise suitable logic, circuitry, and/or code that may be adapted to perform the encryption operations of the AES algorithm on plaintext data blocks to generate ciphertext data blocks that may be transferred through a data channel to at least one device for decoding. Because the AES algorithm is an iterative symmetric block cipher, the AES cipher 100 may operate by repeating the same defined steps multiple times on a fixed number of bytes while utilizing a secret key encryption process. The AES cipher 100 may utilize cryptographic or cipher keys of 128, 192, or 256 bits to encrypt 128 bits data blocks of plaintext. The cipher keys may be received through a secure key channel.

The AES cipher 100 may perform the encryption operations of the AES algorithm on a two-dimensional array of bytes called a state or state array. The state may consist of four rows of bytes, each containing Nb bytes, where Nb is the block length divided by 32. Each individual byte in the state array has two indices, with its row number, r, in the range $0 \leq r < 4$ and its column number, c, in the range $0 \leq c < Nb$. An individual byte in the state array may be referred to as either $s_{r,c}$ or s[r,c]. For a block length of 128 bits, then Nb=4 and $0 \leq c < 4$.

At the start of the encryption operations of the AES algorithm in the AES cipher 100, a data block comprising 128 bits or 16 bytes of plaintext information may be copied or mapped into an initial state according to the scheme: s[r,c]=in[r4c], where $0 \leq r < 4$ and $0 \leq c < Nb$. At the end of the encryption operations in the AES cipher 100, the final value of the state may be copied or mapped to a 128-bit ciphertext output data block by the scheme: out[r+4c]=s[r, 4c], where $0 \leq r < 4$ and $0 \leq c < Nb$.

The number of iterative steps or rounds, Nr, to be performed during the execution of the AES algorithm in the AES cipher 100 may depend on the key length, K, where the key length may be represented by the number of 32-bit words in the cipher key, Nk. For example, cipher keys of 128, 192, or 256 bits may be represented by Nk=4, 6, or 8 respectively. The following table represents the Key-Block-Round combinations that may be supported in the encryption operations of the AES algorithm in the AES cipher 100:

| AES Algorithm | Rounds (Nr) | Data Block Size (Nb) | Key Length (Nk) |
| --- | --- | --- | --- |
| AES-128 | 10 | 4 | 4 |
| AES-192 | 12 | 4 | 6 |
| AES-256 | 14 | 4 | 8 |

The AES algorithm encryption operations are described below as pseudo code:

```
AES_Encrypt(byte in[4*Nb], byte out[4*Nb], word w[Nb*(Nr+1)])
{
    byte state[4,Nb]
    state = in
    AddRoundKey(state, w[0, Nb−1])
    for round = 1 step 1 to Nr−1
    {
        SubBytes(state)
        ShiftRows(state)
        MixColumns(state)
        AddRoundKey(state, w[round*Nb, (round+1)*Nb−1])
    } (end for)
    SubBytes(state)
    ShiftRows(state)
    AddRoundKey(state, w[Nr*Nb, (Nr+1)*Nb−1])
    out = state
}
``` where "in" corresponds to the 128-bit plaintext data block, "out" corresponds to the 128-bit ciphertext data block, "state" corresponds to the 16-byte state array, "w" is a schedule of cipher key values for the various AES encryption rounds, and AddRoundKey, SubBytes, ShiftRows, and MixColumns are byte-oriented encryption functions that may be performed to transform the state or state array during the various AES encryption rounds.

The AddRoundKey function may comprise suitable logic, circuitry, and/or code that may be adapted to add a Round Key to the state by a simple bitwise XOR operation. Each Round Key may consist of Nb words and may be generated through a Key Expansion function that generates a schedule of cipher key values. For example, the AES-128 16-byte cipher key, K, is expanded into a schedule of 11 individual 16-byte Round Keys, w(*), for a total of 176 bytes, where 10 of the 16-byte Round Keys, w(*), correspond to the 10 AES encryption rounds for AES-128 and an additional 16-byte Round Key corresponds to an initial AddRoundKey function performed before the 10 AES encryption rounds, for example, when a round counter value is 0.

The SubBytes function may comprise suitable logic, circuitry, and/or code that may be adapted to perform a non-linear byte substitution that operates independently on each byte of the state by utilizing a substitution table or S-box. For example, a byte s[r,c]={53} may be substituted by a byte s'[r,c] in a substitution table by utilizing the hexadecimal value "5" as a row index and the hexadecimal value "3" as a column index. The ShiftRows function may comprise suitable logic, circuitry, and/or code that may be adapted to cyclically shift the bytes in the last three rows of the state over by different numbers of bytes or offsets. For example, a left most byte, corresponding to the lowest column value, in a second row of the state may be shifted to the highest column position or right most position while the remaining bytes are shifted left by one position. For the third and fourth rows of the state, similar two and three byte shifts may be performed respectively.

The MixColumns function may comprise suitable logic, circuitry, and/or code that may be adapted to determine a state or state array value by left-multiplying the current state by a polynomial matrix. The MixColumns function operates on the state column-by-column, treating each column as a four-term polynomial. According to the standard specification of the AES algorithm, the MixColumns function is not performed during the last AES encryption round, for example, when a round counter value is Nr.

Figure 1B:
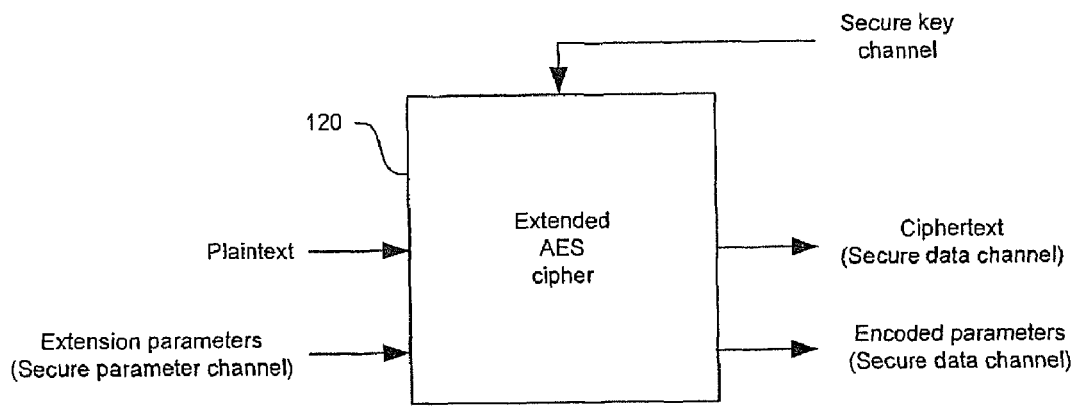
FIG. 1B illustrates an exemplary extended AES cipher that provides additional security measures from those specified for the AES encryption process, in accordance with an embodiment of the invention.

FIG. 1B illustrates an exemplary extended AES cipher that provides additional security measures from those specified for the AES encryption process, in accordance with an embodiment of the invention. Referring to FIG. 1B, an extended AES cipher 120 may comprise suitable logic, circuitry, and/or code that may be adapted to perform the encryption operations provided by the AES algorithm specification and/or expanded security measures that may be compatible with the encryption operations provided by the AES algorithm specification. In this regard, the extended AES cipher 120 may also encrypt plaintext data blocks to generate ciphertext data blocks that may be transferred through a data channel to at least one device for decoding.

The encryption process in the extended AES cipher 120 may be based on cipher keys of 128, 192, or 256 bits received through a secure channel and/or on a plurality of extension parameters provided through a separate secure channel, for example, a 3DES-based channel or an RSA-based channel, where RSA is a public key encryption algorithm invented by Ron Rivest, Adi Shamir, and Leonard Adleman. In some instances, the cipher keys and the extension parameters may be provided to the extended AES cipher 120 through a single secure channel. The extension parameters and/or additional parameters generated from the extension parameters may be encoded by the extended AES cipher 120 and may be transferred for decoding to, for example, the same devices to which the ciphertext data blocks were transferred.

An exemplary pseudo code description of extended security measures for the AES encryption process are described below:

```
Ext_AES_Encrypt(byte in[4*Nb], byte out[4*Nb], word w[Nb*(Nr+1)])
{
    byte state[4,Nb]
    state = in XOR C(0)
    AddRoundKey(state, w[0, Nb-1])
    for round = 1 step 1 to Nr-1
    {
        SubBytes(state)
        ShiftRows(state)
        MixColumns(state)
        state = state XOR C(round)
        AddRoundKey(state, w[round*Nb, (round+1)*Nb-1])
    } (end for)
    SubBytes(state)
    ShiftRows(state)
    AddRoundKey(state, w[Nr*Nb, (Nr+1)*Nb-1])
    out = state XOR C(Nr)
}
``` where "in," "out," "state," "w," and the functions AddRoundKey, SubBytes, ShiftRows, and MixColumns are the same as for the conventional AES encryption process in the AES cipher 100, and where C(0), C(Round), and C(Nr), correspond to user-defined modifying parameters or modifying vectors to be utilized in the extended AES encryption operations. The Key Expansion function that generates a schedule of cipher key values may also be similar to that used in the conventional AES encryption process. The XOR function described in the pseudo code above refers to a bitwise XOR operation between a current state value and a modifying parameter or vector. The initial modifying parameter or initial modifier, C(0), may be utilized by the extended AES cipher 120 to determine the initial state value before the AES encryption rounds, for example, when a round counter value is 0. The modifying parameters or modifiers, C(Round), may be utilized in the first and subsequent encryption rounds, until and including the Nr−1 round, to determine the state or state array value after the MixColumns operation is performed. The final modifying parameter or final modifier, C(Nr), may be utilized by the extended AES cipher 120 to determine the final state or state array value in a final round or when a round counter value is Nr. The final state determined by the final modifier may then be mapped or copied to the ciphertext data block for transmission in a data channel. The use of modifying parameters may provide an additional security measure that is compatible with the conventional AES encryption process.

In a special case of the extended AES encryption process, when C(0)=K1, C(Nr)=K2, the AES cipher key=K, and C(round)=0, for round=1, 2, . . . , Nr−1, the extended encryption process reduces to:

$$\text{Ext\_AES\_Encrypt}_{K,K1,K2}(\text{data}) = K2 \oplus \text{AES}_K(K1 \oplus \text{data}).$$

In this case, the operation of the extended AES cipher 120 corresponds to that of the AES cipher 100 in FIG. 1B where the plaintext has been masked by K1 and the ciphertext has been masked by K2.

Figure 2:
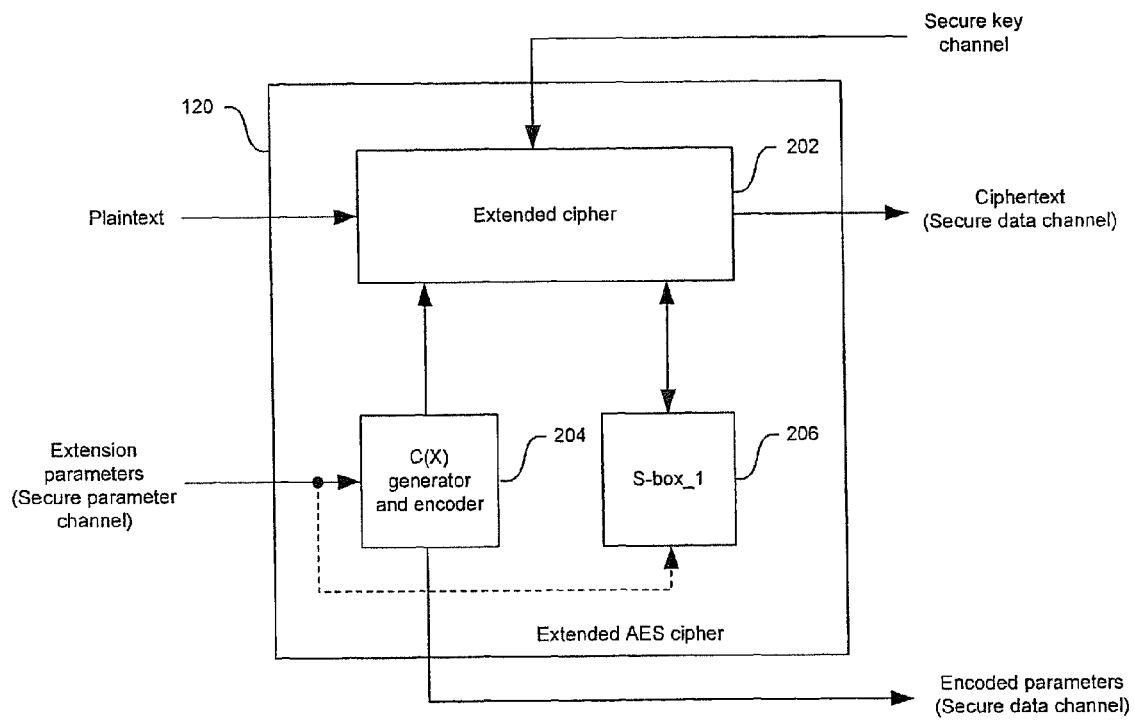
FIG. 2 is a block diagram of an exemplary system for performing extended AES encryption operations, in accordance with an embodiment of the invention.

FIG. 2 is a block diagram of an exemplary system for performing extended AES encryption operations, in accordance with an embodiment of the invention. Referring to FIG. 2, the extended AES cipher 120 may comprise an extended cipher 102, a C(X) generator and encoder 204, and a first substitution box (S-box_1) 206. U.S. patent application Ser. No. 10/932,832 filed Sep. 2, 2004, discloses a detailed hardware accelerator for AES encryption and decryption, and is hereby incorporated herein by reference in its entirety. The extended cipher 102 may comprise suitable logic, circuitry, and/or code that may be adapted to perform the state modification or masking steps described above and the functions AddRoundKey, SubBytes, ShiftRows, MixColumns, and Key Expansion. The extended cipher 102 may also provide a round counter that indicates the current round in the AES encryption process. For example, the round counter value may be 0 before the first AES encryption round and may be Nr during and/or after the last round of AES encryption processing, where Nr=10, 12, or 14 for AES-128, AES-192, or AES-256 respectively. The round counter may be reset to a value of 0 at the start of the encoding process for a new plaintext data block, for example.

The C(X) generator and encoder 204 may comprise suitable logic, circuitry, and/or code that may be adapted to receive a plurality of extension parameters from a secure channel and to utilize the extension parameters to generate a plurality of modifying parameters, C(X), where X refers to the corresponding round in the extended AES encryption process. The secure channel from which the extension parameters may be received are, for example, 3DES-based channels or RSA-based channels. In one embodiment of the invention, the C(X) generator and encoder 204 may comprise a memory or look-up table which may be populated by information received from the extension parameters. The information in the memory or look-up table may then be utilized to generate the modifying parameters, C(X), in the extended AES encryption process. In another embodiment of the invention, the C(X) generator and encoder 204 may comprise a random number generator or a pseudo-random number generator which may be utilized to generate the modifying parameters. In the latter case, the extended AES cipher 120 may receive a seed value as an extension parameter that me be utilized by the pseudo-random number generator to generate the modifying parameters, C(X).

The C(X) generator and encoder 204 may also comprise suitable logic, circuitry, and/or code that may be adapted to encode the extension parameters and/or the modifying parameters for transfer to at least one device for decoding through a secure parameter channel, where the decoding devices may be the same devices to which the ciphertext data blocks may be transferred. The secure parameter channel may also be a 3DES-based channel or a RSA-based channel, for example. Moreover, when the operation of the C(X) generator and encoder 204 is based on a pseudo-random number generator, the seed value received may also be encoded and transferred to the decoding devices through the secure parameter channel.

The S-box_1 206 may comprise suitable logic, circuitry, and/or code that may be adapted to provide a byte-wise non-linear substitution as required by the SubBytes function. The information contained in the S-box_1 206 may be updated through the extension parameters provided to the extended AES cipher 120. In this regard, any update to the look-up table substitution operation provided by the S-box_1 206 may require an update to a corresponding look-up table substitution operation in the decoding devices. This update may be carried out by transferring the necessary information to the C(X) generator and encoder 204 and having the C(X) generator and encoder 204 encode and transfer the information through the secure parameter channel to the decoding devices. U.S. patent application Ser. No. 10/933,702 filed Sep. 2, 2004, discloses a detailed description of an S-box, and is hereby incorporated herein by reference in its entirety.

Figure 3:
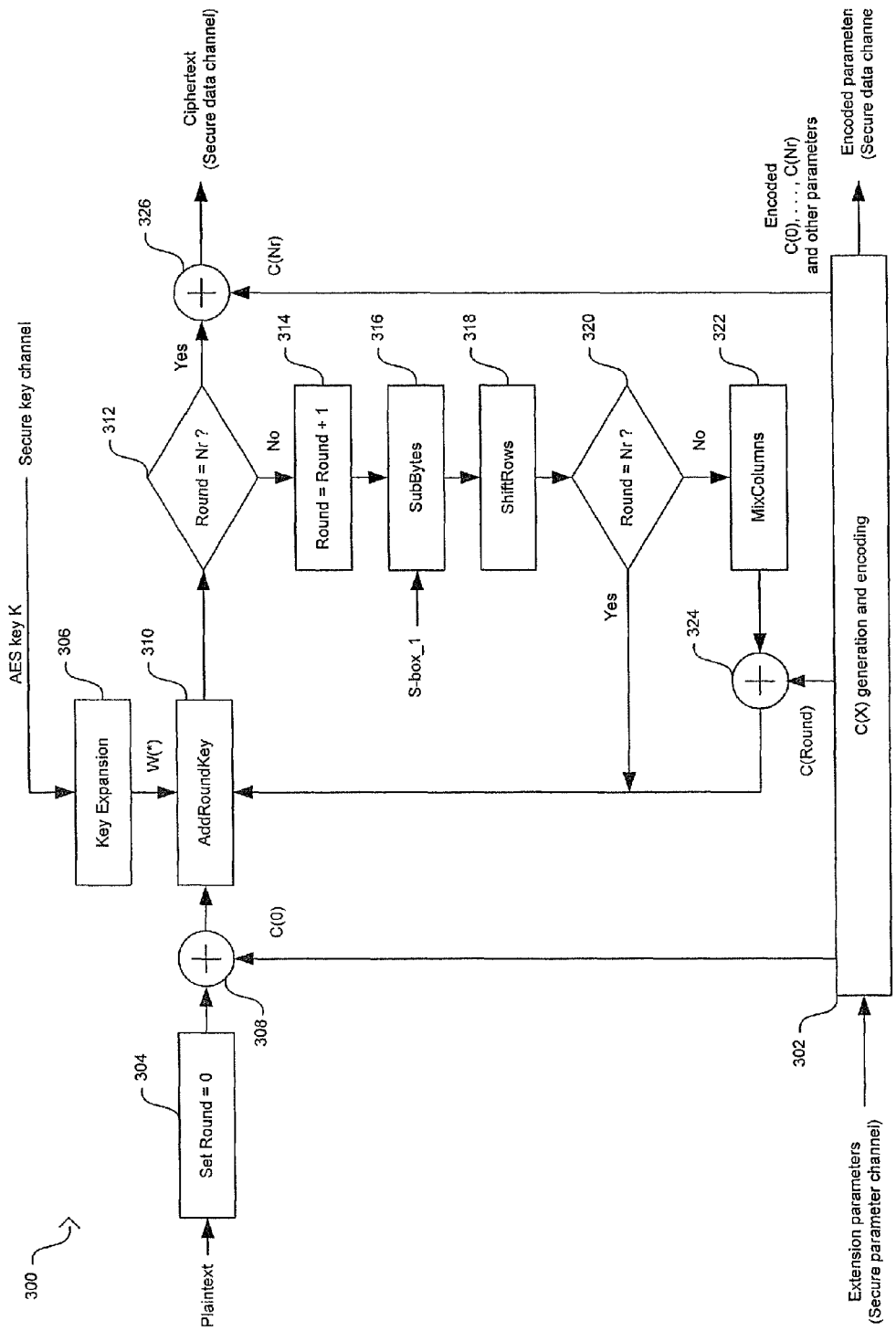
FIG. 3 is a flow diagram that illustrates exemplary steps for performing extended AES encryption operations, in accordance with an embodiment of the invention.

FIG. 3 is a flow diagram that illustrates exemplary steps for performing extended AES encryption operations, in accordance with an embodiment of the invention. Referring to FIG. 3, in step 302 of a flow diagram 300, the modifying parameters, C(X), may be generated and encoded by the C(X) generator and encoder 204 in FIG. 2. In this regard, the modifying parameters necessary for encryption may be generated prior to the extended AES encryption process or may be generated as required during the extended AES encryption process. In step 304, a round counter value may be set to 0 to indicate when a plaintext data block is received as an input data block for encryption. In step 306, the Key Expansion function may be performed on the AES cipher key, K, to generate the key schedule of Round Keys to be used during the extended AES encryption process. In this regard, the Round Keys necessary for encryption may be generated prior to the extended AES encryption process or may be generated as required during the extended AES encryption process. In step 308, the initial state of the extended AES encryption process may be generated by XORing the initial modifier, C(0), with the plaintext data block. In step 310, the AddRoundKey function may be performed on the initial state by utilizing a corresponding Round Key from the key schedule.

In step 312, the extended AES cipher 120 may determine whether a current round is a last round of AES encryption. When the current round is not the last round of AES encryption, the flow diagram 300 may proceed to step 314 where the round counter value may be increased by one. Because the round counter value was currently set to 0, the current round counter value is now set to one, indicating that the current round is a first AES encryption round. In step 316, the SubBytes function may be performed on the state or state array by utilizing the substitution information in the S-box_1 206 during the first AES encryption round.

In step 318, the ShiftRows function may be performed on the state or state array. In step 320, extended AES cipher 120 may determine whether the current round is the last AES encryption round. When the current round is not the last AES encryption round, the flow diagram 300 may proceed to step 322 where the MixColumns function may be performed on the state or state array. In step 324, the output of the MixColumns function may be XORed with a modifying parameter, C(Round), where X=Round indicates the current AES encryption round. Because the current round value is one, the current modifying parameter, C(1), may refer to a first round modifier. The flow diagram 300 may then return to step 310 where the AddRoundKey function may be performed on the modified output of the MixColumns function to generate a first round output state.

Steps 312, 314, 316, 320, 322, and 324 may be performed for AES encryption rounds that are subsequent to the first AES encryption round, where the subsequent AES encryption rounds include up to the penultimate round or Nr−1 AES encryption round. For each of these subsequent AES encryption rounds, the output of the MixColumns function may be XORed with a corresponding round modifier. Moreover, each of these subsequent AES encryption rounds may generate a corresponding subsequent round output state that may be used as the input state for the next AES encryption round. Returning to step 312, when the current round is a last of the subsequent rounds or the penultimate round Nr−1, the flow diagram 300 may proceed to perform steps 314, 316, 318, and 320. In step 320, because the current round is now the last of the AES encryption rounds after the counter value change in step 314, the flow diagram 300 may go to step 310 and perform the AddRoundKey function to generate a final round output state. Returning to step 312, the current round is the last AES encryption round and the flow diagram may proceed to step 326 where the final output state may be XORed with a final modifier to generate the ciphertext data block.

Figure 4A:
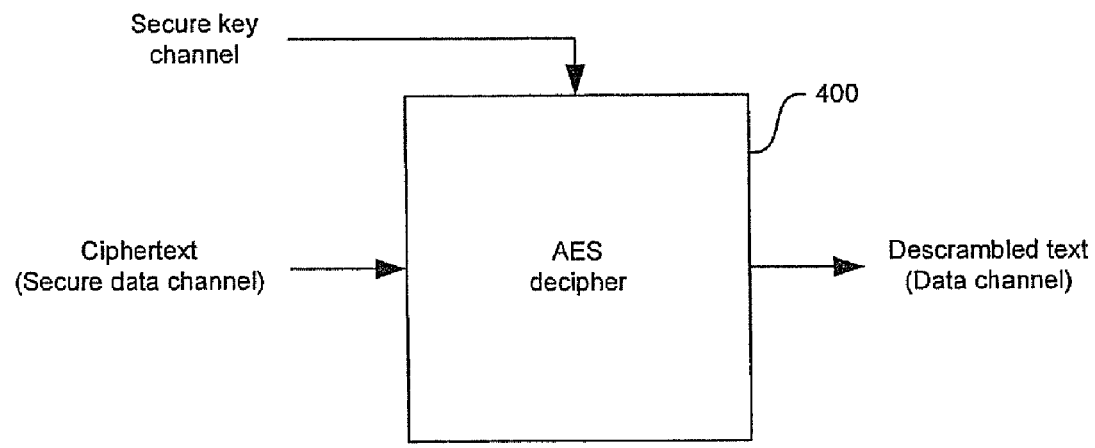
FIG. 4A illustrates an exemplary AES decipher, in connection with an embodiment of the invention.

FIG. 4A illustrates an exemplary AES decipher, in connection with an embodiment of the invention. Referring to FIG. 4A, the AES decipher 400 may comprise suitable logic, circuitry, and/or code that may be adapted to perform the decryption operations of the AES algorithm on cipher text data blocks to generate descrambled data blocks that may be transferred through a data channel to at least one device for further processing. Since the AES algorithm is an iterative symmetric block cipher, the AES decipher 400 may operate by repeating the same defined steps multiple times on a fixed number of bytes while utilizing a secret key encryption process. The AES decipher 400 may utilize cryptographic or cipher keys of 128, 192, or 256 bits to encrypt 128 bits data blocks of plaintext. The cipher keys may be received through a secure key channel.

The AES decipher 400 may perform the decryption operations of the AES algorithm on a two-dimensional array of bytes called a state or state array. The state may consist of four rows of bytes, each containing Nb bytes, where Nb is the block length divided by 32. Each individual byte in the state array has two indices, with its row number, r, in the range $0 \leq r < 4$ and its column number, c, in the range $0 \leq c < Nb$. An individual byte in the state array may be referred to as either $s_{r,c}$ or s[r,c]. For a block length of 128 bits, then Nb=4 and $0 \leq c < 4$.

At the start of the decryption operations of the AES algorithm in the AES decipher 400, a data block comprising 128 bits or 16 bytes of ciphertext information may be copied or mapped into an initial state according to the scheme: s[r,c] =in[r+4c], where $0 \leq r < 4$ and $0 \leq c < Nb$. At the end of the decryption operations in the AES decipher 400, the final value of the state may be copied or mapped to a 128-bit descrambled output data block by the scheme: out[r+4c]=s[r, 4c], where $0 \leq r < 4$ and $0 \leq c < Nb$.

The number of iterative steps or rounds, Nr, to be performed during the execution of the AES algorithm in the AES decipher 400 may depend on the key length, K, where the key length may be represented by the number of 32-bit words in the cipher key, Nk. For example, cipher keys of 128, 192, or 256 bits may be represented by Nk=4, 6, or 8 respectively.

The AES algorithm decryption operations are described below as pseudo code:

```
AES_Decrypt(byte in[4*Nb], byte out[4*Nb], word w[Nb*(Nr+1)])
{
    byte state[4,Nb]
    state = in
    AddRoundKey(state, w[Nr*Nb, (Nr+1)*Nb-1])
    for round = Nr-1 step -1 downto 1
    {
        InvShiftRows(state)
        InvSubBytes(state)
        AddRoundKey(state, w[round*Nb, (round+1)*Nb-1])
        InvMixColumns(state)
    } (end for)
    InvShiftRows(state)
    InvSubBytes(state)
    AddRoundKey(state, w[0, Nb-1])
    out = state
}
``` where "in" corresponds to the 128-bit ciphertext data block, "out" corresponds to the 128-bit descrambled data block, "state" corresponds to the 16-byte state array, "w" is a schedule of cipher key values for the various AES decryption rounds, and AddRoundKey, InvSubBytes, InvShiftRows, and InvMixColumns are byte-oriented decryption functions that may be performed to transform the state or state array during the various AES decryption rounds. The decryption or deciphering functions are the inverse of their corresponding encryption or ciphering functions and may be implemented in the reverse order to produce the decryption process in the AES algorithm.

The AddRoundKey function may comprise suitable logic, circuitry, and/or code that may be adapted to add a Round Key to the state by a simple bitwise XOR operation. The AddRoundKey is its own inverse and it is operationally and functionally similar to the AddRoundKey described for the AES algorithm encryption operations in the AES cipher 100 in FIG. 1A.

The InvSubBytes function may comprise suitable logic, circuitry, and/or code that may be adapted to perform a non-linear byte substitution that operates independently on each byte of the state by utilizing a substitution table or S-box. The non-linear byte substitution is the inverse of the non-linear byte substitution performed by the SubBytes function previously described. The InvShiftRows function may comprise suitable logic, circuitry, and/or code that may be adapted to cyclically shift the bytes in the last three rows of the state over by different numbers of bytes or offsets. The cyclical byte shift performed in the InvShiftRows function is the inverse of the cyclical byte shift performed by the ShiftRows function previously described. The InvMixColumns function may comprise suitable logic, circuitry, and/or code that may be adapted to perform the inverse of the column-based multiplication operations performed by the MixColumns function as previously described. According to the standard specification of the AES algorithm, the InvMixColumns function is not performed during a first AES decryption round. The first AES decryption round may correspond to the inverse operation of the last AES encryption round.

Figure 4B:
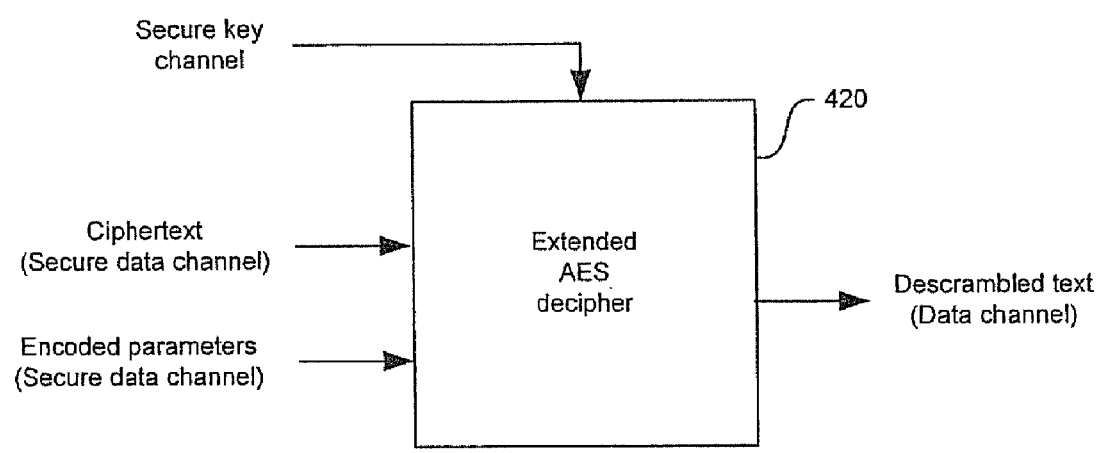
FIG. 4B illustrates an exemplary extended AES decipher that provides additional security measures from those specified for the AES decryption process, in accordance with an embodiment of the invention.

FIG. 4B illustrates an exemplary extended AES decipher that provides additional security measures from those specified for the AES decryption process, in accordance with an embodiment of the invention. Referring to FIG. 4B, an extended AES decipher 420 may comprise suitable logic, circuitry, and/or code that may be adapted to perform the decryption operations provided by the AES algorithm specification and/or expanded security measures that may be compatible with the decryption operations provided by the AES algorithm specification. In this regard, the extended AES decipher 420 may also decrypt ciphertext data blocks to generate scrambled data blocks that may be transferred through a data channel to at least one device for further processing.

The decryption process in the extended AES decipher 420 may be based on cipher keys of 128, 192, or 256 bits received through a secure channel and/or on a plurality of encoded parameters provided through a separate secure channel, for example, a 3DES-based channel or an RSA-based channel. The encoded parameters may comprise the encoded modifying parameters and/or additional parameters such as a seed value, for example. In some instances, the cipher keys and the encoded parameters may be provided to the extended AES decipher 420 through a single secure channel.

An exemplary pseudo code description of extended security measures for the AES decryption process is described below:

```
Ext_AES_Decrypt (byte in[4*Nb], byte out[4*Nb], word w[Nb*(Nr+1)])
{
    byte state[4,Nb]
    state = in XOR C(Nr)
    AddRoundKey(state, w[Nr*Nb, (Nr+1)*Nb-1])
    for round = Nr-1 step -1 downto 1
    {
    InvShiftRows(state)
    InvSubBytes(state)
    AddRoundKey(state, w[round*Nb, (round+1)*Nb-1])
    State = state XOR C(round)
    InvMixColumns(state)
    } (end for)
    InvShiftRows(state)
    InvSubBytes(state)
    AddRoundKey(state, w[0, Nb-1])
    out = state XOR C(0)
}
``` where "in," "out," "state," "w," and the functions AddRoundKey, InvSubBytes, InvShiftRows, and InvMixColumns are the same as for the conventional AES decryption process in the AES decipher 400, and where C(0), C(Round), and C(Nr), correspond to decoded versions of the encoded modifying parameters to be utilized in the extended AES decryption operations. The Key Expansion function that generates a schedule of cipher key values may also be similar to that used in the conventional AES decryption process. The XOR function described in the pseudo code above refers to a bitwise XOR operation between a current state value and a modifying parameter or vector. The initial modifying parameter or initial modifier, C(0), may be utilized by the extended AES decipher 120 to determine the initial state value before the AES decryption rounds, for example, when a round counter value is Nr. The modifying parameters or modifiers, C(Round), may be utilized in the first and subsequent decryption rounds, until and including when the round counter value counts down to 1, to determine the state or state array value before the InvMixColumns operation is performed. The final modifying parameter or final modifier, C(Nr), may be utilized by the extended AES decipher 420 to determine the final state or state array value in a final round or when a round counter value is 0. The final state determined by the final modifier may then be mapped or copied to the descrambled data block for transmission in a data channel. The use of modifying parameters may provide an additional security measure that is compatible with the conventional AES decryption process.

Figure 5:
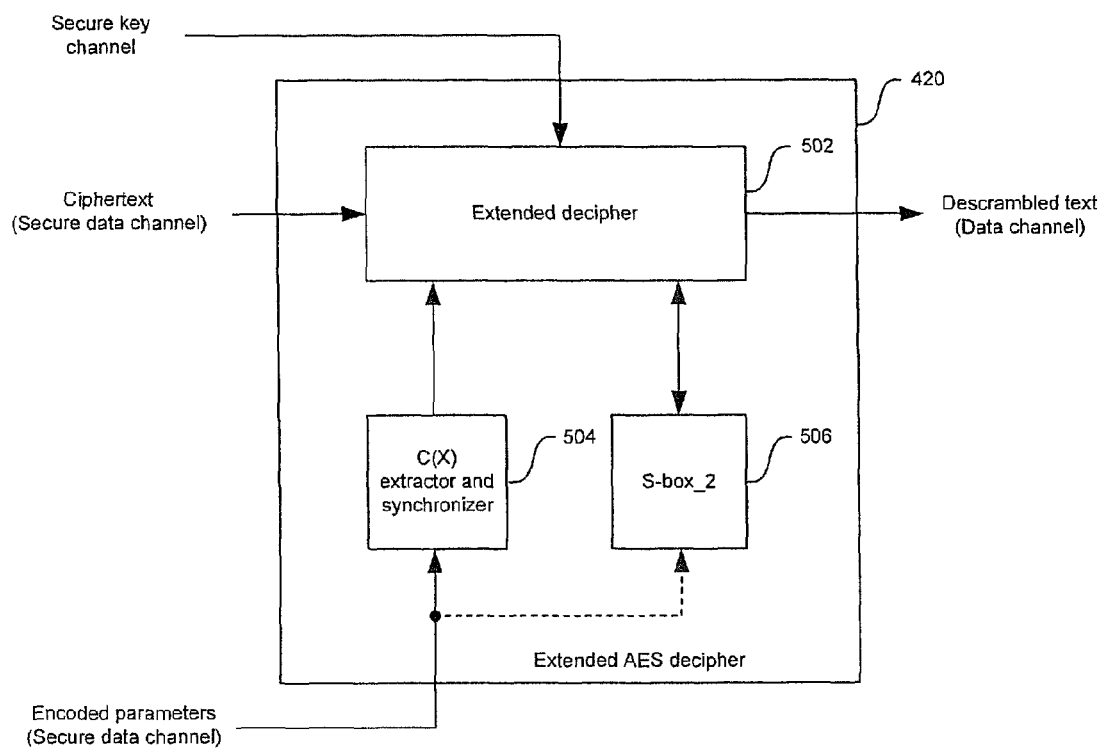
FIG. 5 is a block diagram of an exemplary system for performing extended AES decryption operations, in accordance with an embodiment of the invention.

FIG. 5 is a block diagram of an exemplary system for performing extended AES decryption operations, in accordance with an embodiment of the invention. Referring to FIG. 5, the extended AES decipher 420 may comprise an extended decipher 502, a C(X) extractor and synchronizer 504, and a second substitution box (S-box_2) 506. The extended decipher 502 may comprise suitable logic, circuitry, and/or code that may be adapted to perform the state modification or masking steps described above and the functions Add Round Key, InvSubBytes, InvShiftRows, InvMixColumns, and Key Expansion. The extended decipher 502 may also provide a round counter that indicates the current round in the AES decryption process. For example, the round counter value may be Nr before the first AES decryption round and may be 0 during and/or after the last round of AES decryption processing, where Nr=10, 12, or 14 for AES-128, AES-192, or AES-256 respectively. The round counter may be reset to a value of Nr at the start of the decoding process for a new ciphertext data block, for example.

The C(X) extractor and synchronizer 504 may comprise suitable logic, circuitry, and/or code that may be adapted to receive a plurality of encoded parameters from a secure channel, to decode the encoded parameters and/or extract information from the encoded parameters, and to synchronize the decoded parameters and/or extracted information with the ciphertext data blocks received by the extended decipher 502, where X refers to the corresponding round in the extended AES decryption process. The secure channel from which the encoded parameters may be received are, for example, 3DES-based channels or RSA-based channels. In one embodiment of the invention, the C(X) extractor and synchronizer 504 may comprise a memory or look-up table which may be populated by information extracted and/or decoded from the encoded parameters. The information in the memory or look-up table may then be utilized to generate the modifying parameters, C(X), in the extended AES decryption process. In another embodiment of the invention, the C(X) extractor and synchronizer 504 may comprise a random number generator or a pseudo-random number generator which may be utilized to generate the modifying parameters. In the latter case, the extended AES decipher 420 may receive an encoded seed value as an encoded parameter and may decode the seed value before being utilized by the pseudo-random number generator to generate the modifying parameters, C(X).

The S-box_2 506 may comprise suitable logic, circuitry, and/or code that may be adapted to provide a byte-wise non-linear substitution as required by the InvSubBytes function. The information contained in the S-box_2 506 may be updated through the encoded parameters provided to the extended AES decipher 420. In this regard, any update to the look-up table substitution operation provided by the S-box_2 506 may require an update to a corresponding look-up table operation in an encoding device.

Figure 6:
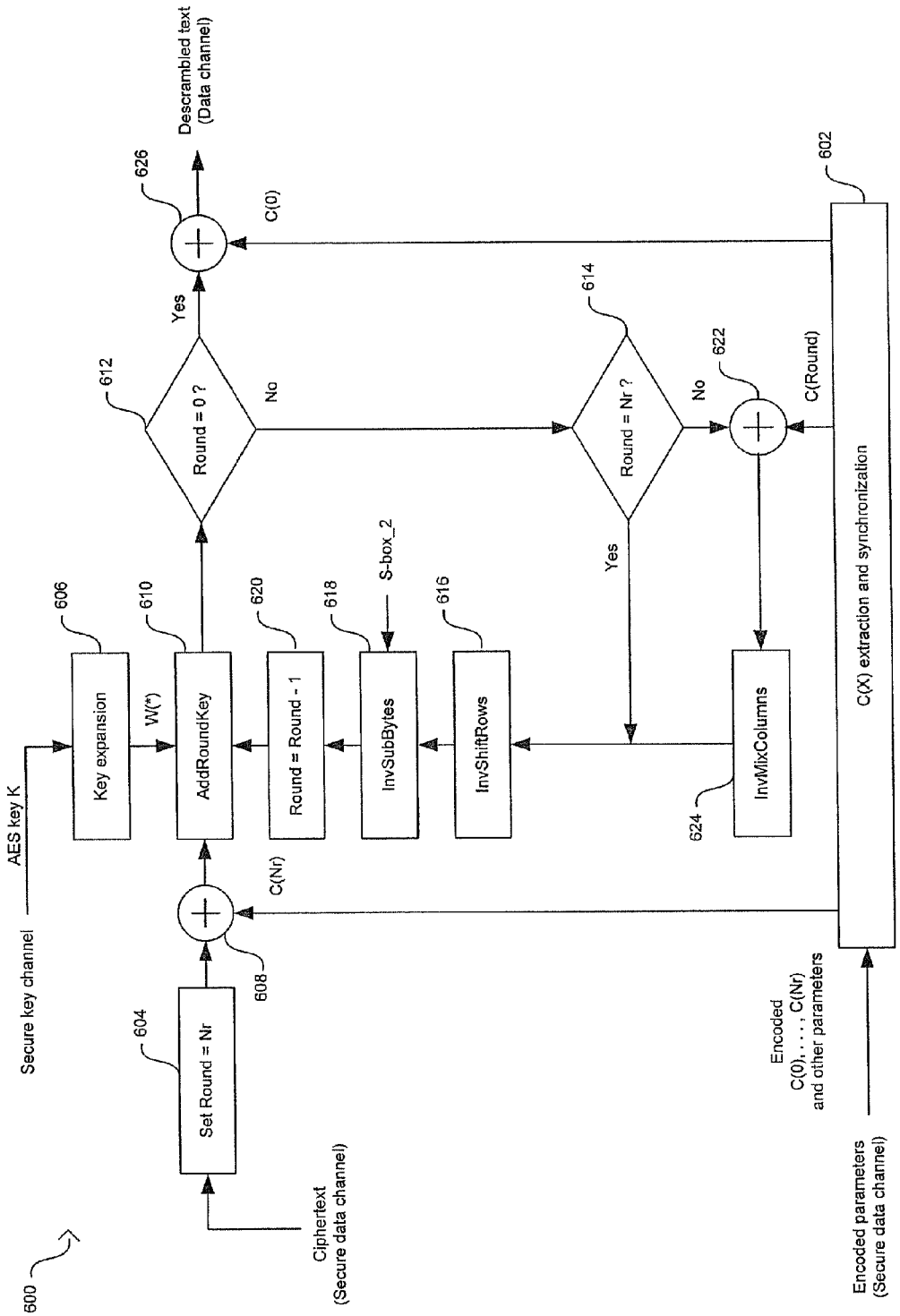
FIG. 6 is a flow diagram that illustrates exemplary steps for performing extended AES decryption operations, in accordance with an embodiment of the invention.

FIG. 6 is a flow diagram that illustrates exemplary steps for performing extended AES decryption operations, in accordance with an embodiment of the invention. Referring to FIG. 6, in step 602 of a flow diagram 600, the modifying parameters, C(X), may be decoded and/or extracted by the C(X) extractor and synchronizer 504 in FIG. 5. In this regard, the modifying parameters necessary for decryption may be generated from the encoded parameters prior to the extended AES decryption process or may be generated as required during the extended AES decryption process. In step 604, a round counter value may be set to Nr to indicate when a ciphertext data block is received as an input data block for decryption. In step 606, the Key Expansion function may be performed on the AES cipher key, K, to generate the key schedule of Round Keys to be used during the extended AES decryption process. In this regard, the Round Keys necessary for decryption may be generated prior to the extended AES decryption process or may be generated as required during the extended AES decryption process. In step 608, the initial state of the extended AES decryption process may be generated by XORing the final modifier, C(Nr), with the ciphertext data block. In step 610, the AddRoundKey function may be performed on the initial state by utilizing a corresponding Round Key from the key schedule.

In step 612, the extended AES decipher 420 may determine whether a current round is a last round of AES decryption, where the last round of AES decryption corresponds to a round counter value of 0, for example. When the current round is not the last round of AES decryption, the flow diagram 600 may proceed to step 614 where the extended AES decipher 420 may determine whether the current round is a first round of AES decryption processing. The first AES decryption round may correspond to a round counter value of Nr. Because the round counter value was currently set to Nr, the current round is the first AES encryption round and the flow diagram 600 may proceed to step 616.

In step 616, the InvShiftRows function may be performed on the state or state array output of the AddRoundKey function during the first AES decryption round. In step 618, the InvSubBytes function may be performed on the state or state array by utilizing the substitution information in the S-box_2 506. The output state from the InvSubBytes function in step 618 may correspond to a first round output state in a first AES decryption round. Following step 618, in step 620, the round counter value may be decreased by one to a value of Nr−1, where Nr−1 may correspond to a round counter value for a second AES decryption round.

The second AES decryption round may comprise steps 610, 612, and 614. In step 614, the round counter value is no longer Nr and the flow diagram 600 may proceed to steps 622 and 624 before performing step 616 during the second AES decryption round. In step 622, the output state from the AddRoundKey may be XORed with a modifying parameter, C(Round), where X=Round indicates the current AES decryption round. In step 624, the InvMixColumns function may be performed on the modified state generated in step 622. All AES decryption rounds subsequent to the first AES decryption round, including the AES decryption round that corresponds to a round counter value of 1, may perform steps 622 and 624. In this regard, the subsequent AES encryption rounds may generate subsequent round output states based on the corresponding round modifiers that may be utilized in step 622.

Returning to step 612, when the current round counter value has reached 0, the AES decipher 420 may generate a descrambled data block by XORing a last of the subsequent round output states with the initial modifier, C(0). The descrambled data block may then be transferred to other processing devices for further processing.

The approach described above may result in a low-cost integrated circuit (IC) solution for implementing the AES algorithm that provides a built-in capability for enhanced security while maintaining compatibility with the encryption and decryption operations specified by the AES standard. This approach may be capable of providing sufficient computational resources to execute the operations of the AES algorithm while also supporting the use of additional security measures.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for increasing encryption security in cryptography operations, the method comprising:
    performing by one or more circuits in a ciphering system:
        generating an initial state from a plaintext data block based on an initial modifier and an initial round encryption key, wherein said initial modifier is generated by a configurable modifier generator;
        generating a first round output state in a first AES encryption round based on said generated initial state, an output of a MixColumns function performed during said first AES encryption round, a first round modifier, and a first round encryption key, wherein said first round modifier is generated by said configurable modifier generator;
        after generating said first round output state, generating subsequent round output states in subsequent AES encryption rounds based on an output to said MixColumns function performed during each of said subsequent AES encryption rounds, a corresponding round modifier generated by said modifier generator, and a corresponding round encryption key; and
        after generating said subsequent round output states, generating a ciphertext data block based on output of a last of said subsequent round output states, a final round encryption key, and a final modifier generated by said modifier generator.

2. The method according to claim 1, comprising transferring said generated ciphertext data block via a first secure data channel to at least one device for decryption.

3. The method according to claim 1, comprising generating said initial modifier, said first round modifier, said corresponding round modifier for each of said subsequent AES encryption rounds, and said final modifier based on a look-up table.

4. The method according to claim 1, comprising generating said initial modifier, said first round modifier, said corresponding round modifier for each of said subsequent AES encryption rounds, and said final modifier randomly or pseudo-randomly.

5. The method according to claim 1, comprising receiving control parameters via a secure parameter channel by said modifier generator, wherein said control parameters are used in generating said initial modifier, said first round modifier, said corresponding round modifier for each of said subsequent AES encryption rounds, and/or said final modifier.

6. The method according to claim 1, comprising encoding said initial modifier, said first round modifier, said corresponding round modifier for each of said subsequent AES encryption rounds, and/or said final modifier.

7. The method according to claim 6, comprising transferring said encoded initial modifier, said encoded first round modifier, said encoded corresponding round modifier for each of said subsequent AES encryption rounds, and said encoded final modifier via a second secure data channel to at least one device for decoding.

8. A method for increasing decryption security in cryptography operations, the method comprising:
    performing by one or more circuits in a ciphering system:
        generating an initial state from a ciphertext data block received via a first secure data channel based on a final modifier and an initial round decryption key, wherein said final modifier is generated by a configurable modifier extractor;
        generating a first round output state in a first AES decryption round based on said generated initial state and a first round decryption key;
        after generating said first round output state, generating each of subsequent round output states in subsequent AES decryption rounds based on an output state of a preceding round, an output of an InvMixColumns function performed during each of said subsequent AES decryption rounds, a corresponding round modifier, and a corresponding round decryption key, wherein said round modifier is generated by said configurable modifier extractor; and
        generating a descrambled data block based on a last of said generated subsequent round output states, an initial modifier, and a last round decryption key, wherein said initial modifier is generated by said configurable modifier extractor.

9. The method according to claim 8, comprising transferring said generated descrambled data block via a data channel to at least one device for further processing.

10. The method according to claim 8, comprising generating said initial modifier, said corresponding round modifier for each of said subsequent AES decryption rounds, and said final modifier based on a look-up table.

11. The method according to claim 5, comprising generating said initial modifier, said corresponding round modifier for each of said subsequent AES decryption rounds, and said final modifier randomly or pseudo-randomly.

12. The method according to claim 11, comprising decoding a seed value received via a second secure data channel to be utilized in said pseudo-random generation.

13. The method according to claim 8, comprising receiving an encoded control data via a second secure data channel.

14. The method according to claim 13, comprising decoding said received encoded control data for use in generating said initial modifier, said corresponding round modifier for each of said subsequent AES decryption rounds, and/or said final modifier.

15. A non-transitory machine-readable storage having stored thereon, a computer program having at least one code for increasing encryption security in cryptography operations, the at least one code section being executable by a machine for causing the machine to perform steps comprising:
generating an initial state from a plaintext data block based on an initial modifier and an initial round encryption key, wherein said initial modifier is generated by a configurable modifier generator;
generating a first round output state in a first AES encryption round based on said generated initial state, an output of a MixColumns function performed during said first AES encryption round, a first round modifier, and a first round encryption key, wherein said first round modifier is generated by said configurable modifier generator;
after generating said first round output state, generating subsequent round output states in subsequent AES encryption rounds based on output of said MixColumns function performed during each of said subsequent AES encryption rounds, a corresponding round modifier generated by said modifier generator, and a corresponding round encryption key; and
after generating said subsequent round output states, generating a ciphertext data block based on a final round encryption key and a final modifier generated by said modifier generator.

16. The non-transitory machine-readable storage according to claim 15, wherein said at least one code section comprises code for transferring said generated ciphertext data block via a first secure data channel to at least one device for decryption.

17. The non-transitory machine-readable storage according to claim 15, wherein said at least one code section comprises code for generating said initial modifier, said first round modifier, said corresponding round modifier for each of said subsequent AES encryption rounds, and said final modifier based on a look-up table.

18. The non-transitory machine-readable storage according to claim 15, wherein said at least one code section comprises code for generating said initial modifier, said first round modifier, said corresponding round modifier for each of said subsequent AES encryption rounds, and said final modifier randomly or pseudo-randomly.

19. The non-transitory machine-readable storage according to claim 15, wherein said at least one code section comprises code for receiving control parameters via a secure parameter channel by said modifier generator, wherein said control parameters are used in generating said initial modifier, said first round modifier, said corresponding round modifier for each of said subsequent AES encryption rounds, and/or said final modifier.

20. The non-transitory machine-readable storage according to claim 15, wherein said at least one code section comprises code for encoding said initial modifier, said first round modifier, said corresponding round modifier for each of said subsequent AES encryption rounds, and/or said final modifier.

21. The non-transitory machine-readable storage according to claim 20, wherein said at least one code section comprises code for transferring said encoded initial modifier, said encoded first round modifier, said encoded corresponding round modifier for each of said subsequent AES encryption rounds, and said encoded final modifier via a second secure data channel to at least one device for decoding.

22. A non-transitory machine-readable storage having stored thereon, a computer program having at least one code for increasing decryption security in cryptography operations, the at least one code section being executable by a machine for causing the machine to perform steps comprising:
generating an initial state from a ciphertext data block received via a first secure data channel based on a final modifier and an initial round decryption key, wherein said final modifier is generated by a configurable modifier extractor;
generating a first round output state in a first AES decryption round based on said generated initial state and a first round decryption key;
after generating said first round output state, generating each of subsequent round output states in subsequent AES decryption rounds based on an output state of a preceding round, an output of a InvMixColumns function performed during each of said subsequent AES decryption rounds, a corresponding round modifier, and a corresponding round decryption key, wherein said round modifier is generated by said configurable modifier extractor; and
generating a descrambled data block based on a last of said generated subsequent round output states, an initial modifier, and a last round decryption key, wherein said initial modifier is generated by said configurable modifier extractor.

23. The non-transitory machine-readable storage according to claim 22, wherein said at least one code section comprises code for transferring said generated descrambled data block via a data channel to at least one device for further processing.

24. The non-transitory machine-readable storage according to claim 22, wherein said at least one code section comprises code for generating said initial modifier, said corresponding round modifier for each of said subsequent AES decryption rounds, and said final modifier based on a look-up table.

25. The non-transitory machine-readable storage according to claim 22, wherein said at least one code section comprises code for generating said initial modifier, said corresponding round modifier for each of said subsequent AES decryption rounds, and said final modifier randomly or pseudo-randomly.

26. The non-transitory machine-readable storage according to claim 25, wherein said at least one code section comprises code for decoding a seed value received through a second secure data channel to be utilized in said pseudo-random generation.

27. The non-transitory machine-readable storage according to claim 22, wherein said at least one code section comprises code for receiving an encoded data by said modifier extractor via a second secure data channel.

28. The non-transitory machine-readable storage according to claim 27, wherein said at least one code section comprises code for decoding said received encoded data to generate decoded data used in generating said initial modifier, said corresponding round modifier for each of said subsequent AES decryption rounds, and/or said final modifier respectively.

29. A system for increasing encryption security in cryptography operations, the system comprising:
one or more circuits that are operable to generate an initial state from a plaintext data block based on an initial modifier and an initial round encryption key, wherein said initial modifier is generated by a configurable modifier generator;
said one or more circuits are operable to generate a first round output state in a first AES encryption round based on said generated initial state, an output of a MixColumns function performed during said first AES encryption round, a first round modifier, and a first round encryption key, wherein said first round modifier is generated by said configurable modifier generator;
said one or more circuits are operable to generate of subsequent round output states in subsequent AES encryption rounds, after generating said first round output state, based on output of said MixColumns function performed during each of said subsequent AES encryption rounds, a corresponding round modifier generated by said modifier generator, and a corresponding round encryption key; and
said one or more circuits are operable to generate a ciphertext data block based on a final round encryption key and a final modifier generated by said modifier generator.

30. The system according to claim 29, wherein said one or more circuits are operable to transfer said generated ciphertext data block via a first secure data channel to at least one device for decryption.

31. The system according to claim 29, wherein said one or more circuits are operable to generate said initial modifier, said first round modifier, said corresponding round modifier for each of said subsequent AES encryption rounds, and said final modifier based on a look-up table.

32. The system according to claim 29, wherein said one or more circuits are operable to generate said initial modifier, said first round modifier, said corresponding round modifier for each of said subsequent AES encryption rounds, and said final modifier randomly or pseudo-randomly.

33. The system according to claim 29, wherein said one or more circuits are operable to receive control parameters via a secure parameter channel, wherein said control parameters are used in generating said initial modifier, said first round modifier, said corresponding round modifier for each of said subsequent AES encryption rounds, and/or said final modifier.

34. The system according to claim 29, wherein said one or more circuits are operable to encode said initial modifier, said first round modifier, said corresponding round modifier for each of said subsequent AES encryption rounds, and/or said final modifier.

35. The system according to claim 34, wherein said one or more circuits are operable to transfer said encoded initial modifier, said encoded first round modifier, said encoded corresponding round modifier for each of said subsequent AES encryption rounds, and said encoded final modifier via a second secure data channel to at least one device for decoding.

36. A system for increasing decryption security in cryptography operations, the system comprising:
one or more circuits that are operable to generate an initial state from a ciphertext data block received via a first secure data channel based on a final modifier and an initial round decryption key, wherein said final modifier is generated by a configurable modifier extractor;
said one or more circuits are operable to generate a first round output state in a first AES decryption round based on said generated initial state and a first round decryption key;
said one or more circuits are operable to generate each of subsequent round output states in subsequent AES decryption rounds, after generating said first round output state, based on an output state of a preceding round, an output of a InvMixColumns function performed during each of said subsequent AES decryption rounds, a corresponding round modifier, and a corresponding round decryption key, wherein said round modifier is generated by said configurable modifier extractor; and
said one or more circuits enable generation of a descrambled data block based on a last of said generated subsequent round output states, an initial modifier, and a last round decryption key is added to generate said last round output state, wherein said initial modifier is generated by said configurable modifier extractor.

37. The system according to claim 36, wherein said one or more circuits are operable to transfer said generated descrambled data block via a data channel to at least one device for further processing.

38. The system according to claim 36, wherein said one or more circuits are operable to generate said initial modifier, said corresponding round modifier for each of said subsequent AES decryption rounds, and said final modifier based on a look-up table.

39. The system according to claim 36, wherein said one or more circuits are operable to generate said initial modifier, said corresponding round modifier for each of said subsequent AES decryption rounds, and said final modifier randomly or pseudo-randomly.

40. The system according to claim 39, wherein said one or more circuits are operable to decode a seed value received via a second secure data channel to be utilized in said pseudo-random generation.

41. The system according to claim 36, wherein said one or more circuits are operable to receive an encoded control data via a second secure data channel.

42. The system according to claim 41, wherein said one or more circuits are operable to decode said received encoded control data to generate said received encoded final modifier into said initial modifier, said corresponding round modifier for each of said subsequent AES decryption rounds, and said final modifier respectively.

* * * * *